(No Model.)
S. R. BAILEY.
THILL COUPLING.
No. 556,611. Patented Mar. 17, 1896.
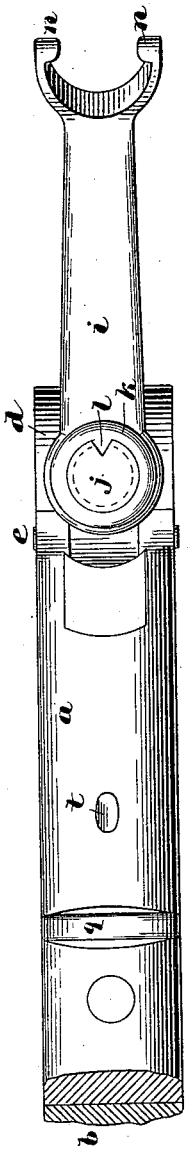
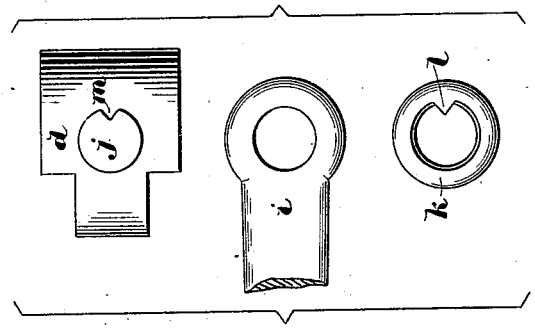
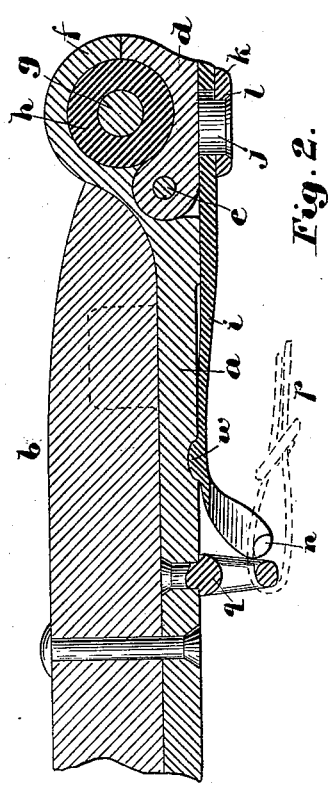
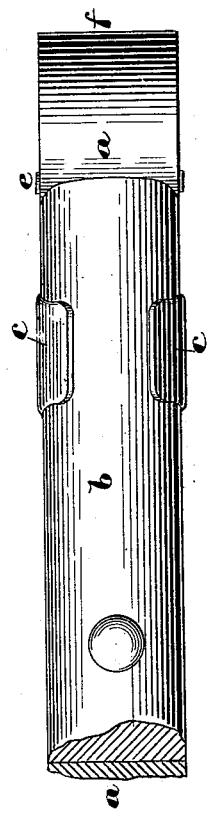
Witnesses:
Walter E. Lombard.
M. E. Bondilch
Inventor:
Samuel R. Bailey
per T. W. Porter Atty

UNITED STATES PATENT OFFICE.

SAMUEL R. BAILEY, OF AMESBURY, MASSACHUSETTS.

THILL-COUPLING.

SPECIFICATION forming part of Letters Patent No. 556,611, dated March 17, 1896.

Application filed August 17, 1895. Serial No. 559,596. (No model.)

*To all whom it may concern:*

Be it known that I, SAMUEL R. BAILEY, of Amesbury, in the county of Essex and State of Massachusetts, have invented a new and useful Improvement in Carriage-Shaft Shackles, which will, in connection with the accompanying drawings, be hereinafter fully described, and specifically defined in the appended claims.

In said drawings, Figure 1 is an under side plan view of my shackle-eye with the spring-latch swung back. Fig. 2 is a longitudinal vertical section through the shackle-eye, the spring-latch, the rear end of the shaft, the pivot-bolt, and the rubber packing on the bolt. Fig. 3 is a top plan view of the rear part of the shaft and of the shackle-eye. Fig. 4 is a detached under side view of the latch-spring, the pivoted part of the shackle, and of the washer that is arranged on the pivot that holds the latch-spring in place.

This invention relates to the rear part of the strap secured to the under side of carriage-shafts, usually termed the "shackle-eye," as it is the eye that is pivoted to the shackle that is secured to the axle of the vehicle; and the invention consists in the peculiar construction of the eye, the parts thereto attached, and the combinations thereof, as will be next herein described and then pointed out in the claims.

Referring again to said drawings, $a$ represents the metal strap, and $b$ the rear portion of the shaft, to which it is secured, while $c$ $c$ are ears formed on part $a$, and which are bent to part $b$ to aid in holding the two firmly together.

At $d$ is shown a piece hinged to $a$ by pivot $e$ and which in conjunction with $a$ constitutes the inclosed circle $f$, which surrounds the pivot-bolt $g$ and rubber packing $h$. A spring $i$ is pivoted to $d$ by pivot $j$, preferably formed as part of $d$, a washer $k$ being placed upon said pivot outside the spring, as shown, said washer being formed with an internal spline $l$, that fits in slot $m$, formed in pivot $j$, so that the washer cannot revolve when spring $i$ is turned to the rear in order to open out part $d$ to disengage the shafts from the vehicle.

At the front end spring $i$ is formed with a loop $n$, that receives the strap $p$, which at its rear end is secured either to the axle direct or to a yoke that is secured to the axle.

A loop $q$ may be either formed as part of strap $a$ or it may be secured thereto, and the strap $p$ will also pass through said loop $q$ to secure the shafts to the vehicle in case of accident or negligence.

A depression $t$ is formed in strap $a$, and an enlargement $w$ formed on the under side of spring $i$ is arranged to fit into said depression to hold said spring in place when it is swung to the front and circle $f$ is closed.

Having thus described my invention, what I claim as new, and desire to secure by Letters Patent, is—

1. A shaft-shackle formed with part $a$ adapted to be secured to shaft $b$, part $d$ hinged to part $a$, and part $i$ secured to part $d$ so that said part $i$ can be swung to the rear in the practical plane of part $a$ to unlock part $d$, and to the front to lock said part $d$, to secure the shafts to the vehicle, substantially as specified.

2. A shaft-shackle formed with part $a$ adapted to be secured to shaft $b$, part $d$ hinged to part $a$, and formed with pivot $j$ at right angles or nearly so to pivot $e$ of said part $d$, and the part $i$ secured upon pivot $j$ and arranged to operate substantially as specified.

3. A shaft-shackle formed with strap $a$ to be secured to the shaft $b$, part $d$ hinged to part $a$, and the two formed with the inclosing circle $f$ to receive the pivot-bolt $g$ and rubber $h$: the spring $i$ pivoted to part $d$ and arranged when swung forward to close said part $d$: a loop $n$ formed at the front end of part $i$ and a loop $q$ on part $a$ arranged to receive the safety-strap that passes through loop $n$, all substantially as specified.

4. In a shaft-shackle, the hinged piece $d$, the spring $i$ thereto pivoted, the washer $k$ formed with an internal spline $l$ and pivot $j$ formed with a groove to receive said spline, whereby, the spring $i$ can revolve on said pivot but the washer $k$ is thereto locked substantially as specified.

5. In a shaft-shackle, the spring $i$ pivoted upon part $d$ and arranged to be swung on its pivot to the front and rear: and the depression $t$ formed in the strap $a$ and the downward enlargement $w$ of spring $i$, to enter said depression and lock spring $i$ in place, substantially as specified.

SAMUEL R. BAILEY.

Witnesses:
T. W. PORTER,
M. E. BOWDITCH.